(12) United States Patent
Chin et al.

(10) Patent No.: US 7,974,659 B2
(45) Date of Patent: *Jul. 5, 2011

(54) REPEAT DIALING IN WIRELESS NETWORKS TO CALLED PARTIES THAT ARE POWERED OFF

(75) Inventors: Frances Mu-Fen Chin, Naperville, IL (US); Paul C. Mui, Countryside, IL (US); Alok Sharma, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/826,428

(22) Filed: Jun. 29, 2010

(65) Prior Publication Data

US 2010/0267382 A1 Oct. 21, 2010

Related U.S. Application Data

(63) Continuation of application No. 11/094,116, filed on Mar. 30, 2005, now Pat. No. 7,792,549.

(51) Int. Cl.
*H04M 1/00* (2006.01)

(52) U.S. Cl. .................. 455/564; 455/460; 379/209.01

(58) Field of Classification Search .................. 455/460, 455/564; 379/209.01
See application file for complete search history.

(56) References Cited

U.S. PATENT DOCUMENTS 7,792,549 B2 * 9/2010 Chin et al. .................... 455/564

* cited by examiner

*Primary Examiner* — Raymond S Dean
(74) *Attorney, Agent, or Firm* — Duft, Bornsen & Fishman, LLP

(57) ABSTRACT

A wireless network is disclosed that provides repeat dialing to called parties that are powered off. The wireless network includes an originating MSC system, a Home Location Register (HLR) system for a called party, and a serving MSC system that serves the called party. Responsive to identifying that the called party is powered off, the calling party transmits a repeat dialing instruction to the originating MSC system. The originating MSC system then transmits a repeat dialing indicator to the HLR system for the called party. The HLR system for the called party identifies when the called party powers on. When the called party does power on, the HLR system transmits an instruction to the serving MSC system to attempt to set up a call between the called party and the calling party.

11 Claims, 7 Drawing Sheets

REPEAT DIALING IN WIRELESS NETWORKS TO CALLED PARTIES THAT ARE POWERED OFF

RELATED APPLICATIONS

This non-provisional patent application is a continuation of U.S. patent application Ser. No. 11/094,116 filed on Mar. 30, 2005 now U.S. Pat. No. 7,792,549, which is incorporated by reference as if fully provided herein.

BACKGROUND OF THE INVENTION

1. Field of the Invention

The invention is related to the field of communication networks, and in particular, to networks and methods for implementing the feature of repeat dialing in wireless networks to called parties that are powered off.

2. Statement of the Problem

Telephone service providers offer many features to service subscribers. One feature offered to traditional wireline subscribers is repeat dialing of busy numbers. Assume a caller places a call to a dialed number. Within the telephone network, an originating switch receives the call and routes the call to a terminating switch for the dialed number. The terminating switch determines that the circuit for that dialed number is busy, and responds to the originating switch that the dialed number is busy. The originating switch plays busy tones to the caller. When the caller hears the busy tones, the caller hangs up the telephone. The caller then picks up the receiver on the telephone and enters a code, such as *66, into the telephone to activate the repeat dialing feature to the last-dialed number. The caller can then hang up the telephone go about other business. The telephone network attempts to set up a call to the dialed number when the dialed number becomes available.

Within the telephone network, the originating switch receives the code entered by the caller. The originating switch informs the terminating switch that repeat dialing has been activated for the dialed number. When the circuit for the dialed number becomes available, the terminating switch identifies that repeat dialing has been activated for the dialed number. The terminating switch then attempts to set up a call from the caller to the dialed number. The caller may receive a special tone indicating that the dialed number is now available.

One problem with the current repeat dialing feature is that the feature is only effectively implemented and offered for wire line telephone networks. The repeat dialing feature is not currently offered for cellular networks or other wireless networks. Also, the repeat dialing is only offered for busy numbers. Wireless networks present an additional issue that mobile phones may be powered off. When a mobile phone is powered off, calls to that mobile phone will go unanswered and most likely routed to voice mail. A problem exists that a repeat dialing feature to powered-off mobile phones is not currently offered. With the large number of mobile subscribers, wireless service providers are missing out on large revenues by not offering the repeat dialing feature.

SUMMARY OF THE SOLUTION

The invention solves the above and other related problems by providing for repeat dialing in wireless networks for mobile called parties that are powered off. Service providers can advantageously offer the repeat dialing feature to a growing number of mobile subscribers. Repeat dialing is effectively implemented by having a Home Location Register (HLR) system for the mobile called party identify when the mobile called party has powered on. The HLR system can advantageously determine when the called party has powered on in substantially real time. The HLR system can then instruct the Mobile Switching Center (MSC) system serving the called party to attempt to set up a call to the called party. Therefore, the called party is repeat-dialed very soon after being powered on. The calling party advantageously does not need to repeatedly dial the called party to try to reach the called party.

One embodiment of the invention comprises a wireless network that provides repeat dialing to mobile called parties that are powered off. The wireless network includes an originating MSC system, an HLR system for a called party, and a serving MSC system for serving the called party. When in operation, a calling party initiates a call to the called party through the originating MSC system. The originating MSC system receives the call and transmits a query message to the HLR system for the called party. The called party is powered off at this time, so the HLR system for the called party determines that called party is powered off. The HLR system for the called party then transmits a response message to the originating MSC system indicating that the called party is powered off. The originating MSC system may then indicate to the calling party that the called party is powered off, such as with an announcement or a no-answer signal.

The calling party then activates the repeat dialing feature by entering a repeat dialing instruction. The originating MSC system receives a repeat dialing instruction, and transmits a repeat dialing indicator to the HLR system for the called party. At this point, repeat dialing is activated.

When repeat dialing is activated, the HLR system monitors the called party to determine when the called party powers on. Assume that the called party does power on and register with the serving MSC system. The serving MSC system transmits a registration message to the HLR system for the called party. The HLR system for the called party identifies when the called party powers on. The HLR system then transmits an instruction to the serving MSC system to attempt to set up a call between the called party and the calling party responsive to identifying that the called party has powered on.

The invention may include other exemplary embodiments described below.

DESCRIPTION OF THE DRAWINGS

The same reference number represents the same element on all drawings.

DETAILED DESCRIPTION OF THE INVENTION

FIGS. 1-7 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
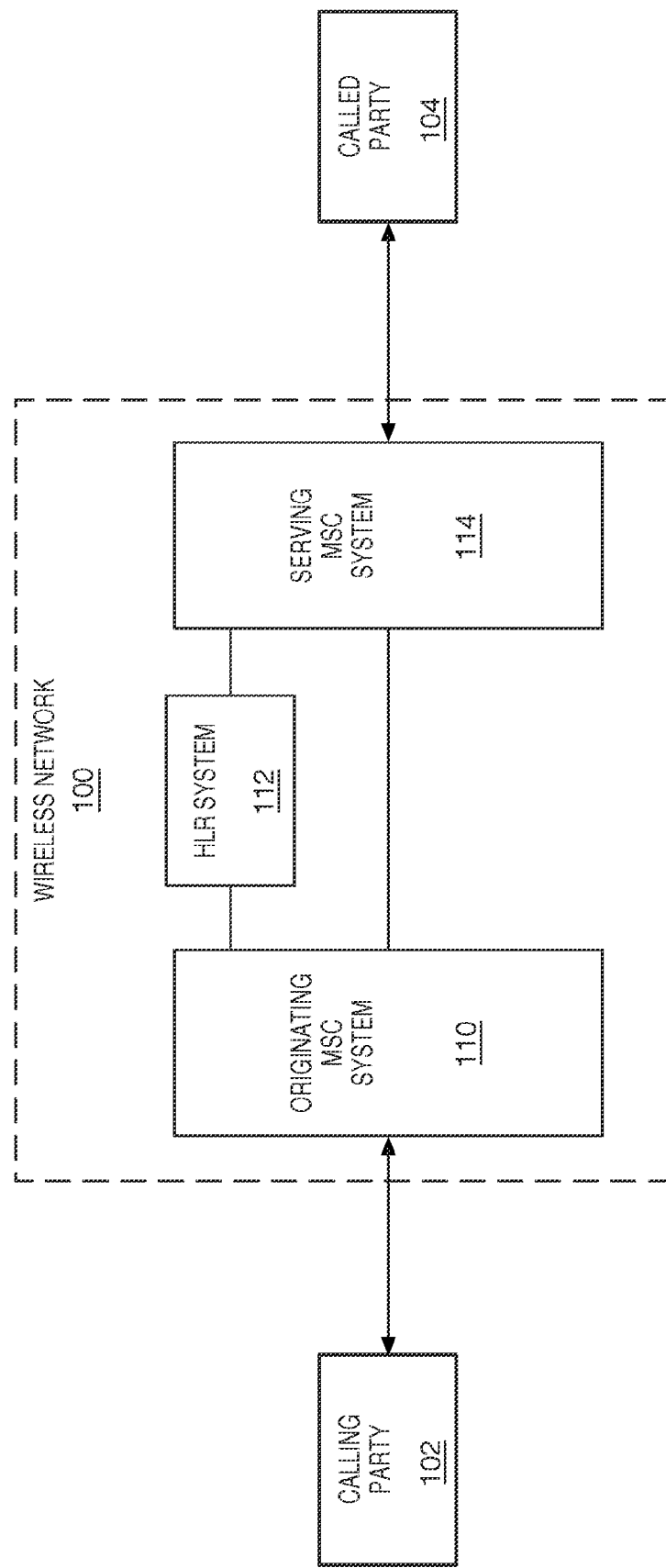
FIG. 1 illustrates a wireless network in an exemplary embodiment of the invention.

FIG. 1 illustrates a wireless network 100 in an exemplary embodiment of the invention. Wireless network 100 includes an originating Mobile Switching Center (MSC) system 110, a Home Location Register (HLR) system 112, and a serving Mobile Switching Center (MSC) system 114. Originating MSC system 110 comprises any system that performs the functions similar to a Mobile Switching Center to originate a call in wireless network 100. HLR system 112 comprises any system that performs the functions similar to a Home Location Register for called party 104. There may be another HLR system (not shown) for calling party 102, or calling party 102 may share HLR system 112. Serving MSC system 114 comprises any system that performs the functions similar to a Mobile Switching Center to serve called party 104 when called party 104 is powered on. Wireless network 100 may include other networks, systems, or devices not shown for the sake of brevity.

As previously stated, originating MSC system 110 originates a call into wireless network 100. If calling party 102 is a mobile calling party, then originating MSC system 110 comprises the MSC system serving the mobile calling party. Originating MSC system 110 and serving MSC system 114 may comprise the same MSC system if the mobile calling party 102 and the mobile called party 104 are in the same service area. If calling party 102 is a wire line calling party, then originating MSC system 110 receives the call from calling party 102 through a central office or some other gateway between the wire line network and wireless network 100.

Called party 104 is mobile in this embodiment. The term "called party" may refer to a communication device and a user of the communication device. Being mobile, called party 104 includes a mobile communication device, such as a mobile phone, a PDA, a laptop computer, etc, that is portable or otherwise mobile and transmits and receives messages via wireless signals.

When in operation, calling party 102 initiates a call to called party 104. Originating MSC system 110 receives the call and transmits a query message to HLR system 112 for called party 104. Called party 104 is powered off at this time, so HLR system 112 determines that called party 104 is powered off. HLR system 112 transmits a response message to originating MSC system 110 indicating that called party 104 is powered off. Originating MSC system 110 may then indicate to calling party 102 that called party 104 is powered off. For instance, originating MSC system 110 may transmit an announcement to calling party 102 indicating that called party 104 is powered off. Originating MSC system 110 may also route the call to a voice mail server for called party 104, which indicates to calling party 102 that called party 104 is unavailable (i.e., powered off). Once originating MSC system 110 indicates to calling party 102 that called party 104 is powered off, calling party 102 may activate the repeat dialing feature.

Figure 2:
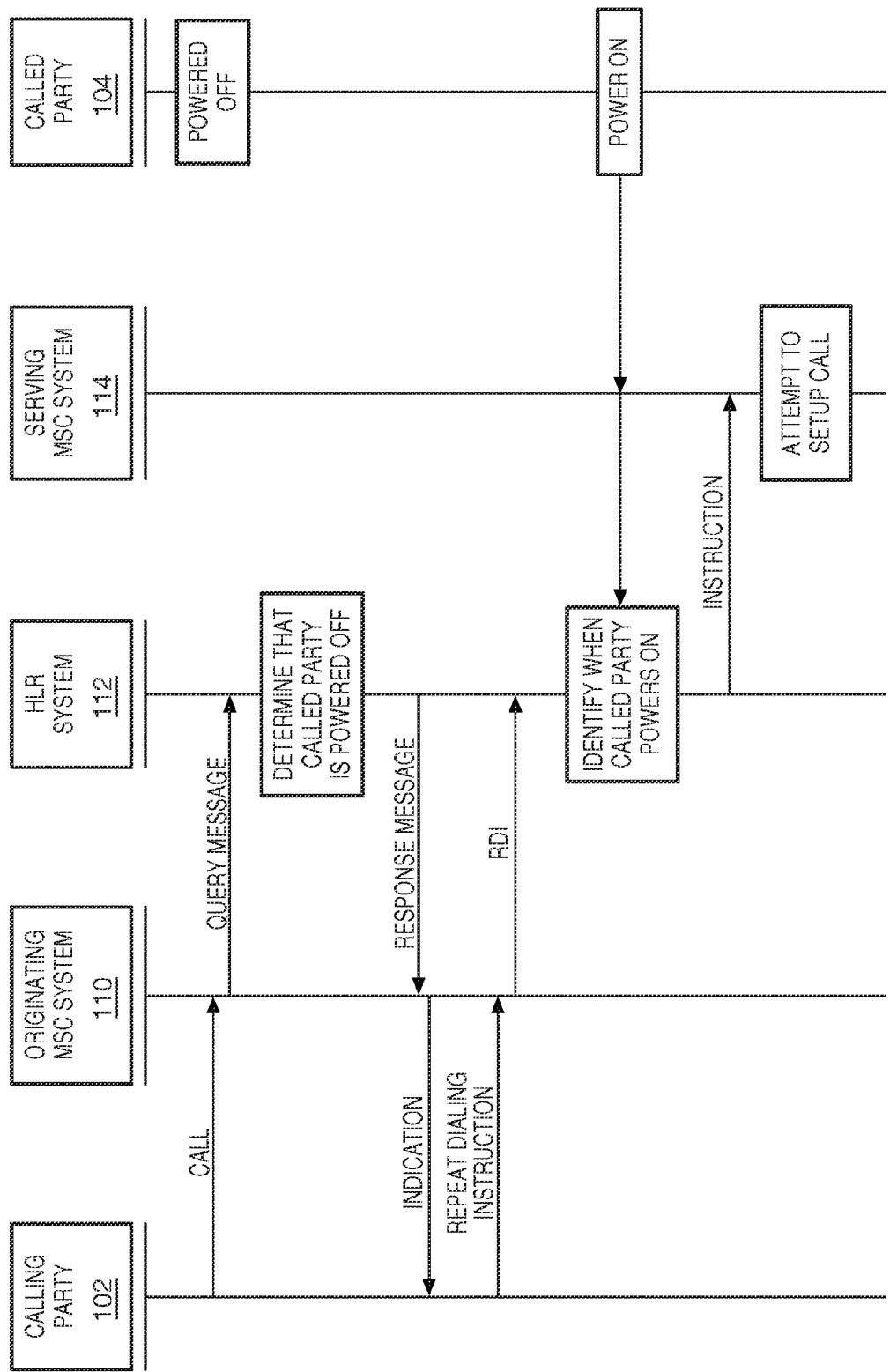
FIG. 2 is a message diagram illustrating repeat dialing in the wireless network of FIG. 1 in an exemplary embodiment of the invention.

FIG. 2 is a message diagram illustrating repeat dialing in wireless network 100 in an exemplary embodiment of the invention. To activate the repeat dialing feature, calling party 102 transmits a repeat dialing instruction to originating MSC system 110. The repeat dialing instruction comprises any code, data, or other instruction that indicates that calling party wants to activate the repeat dialing feature. Originating MSC system 110 receives the repeat dialing instruction from calling party 102. Responsive to the repeat dialing instruction, originating MSC system 110 transmits a repeat dialing indicator (RDI) to HLR system 112 for called party 104. A repeat dialing indicator comprises any data, code, flag, or other information that indicates that the repeat dialing feature has been activated by calling party 102. Originating MSC system 110 may also transmit a Mobile Station Identifier (MSID) for calling party 102 to HLR system 112 with the repeat dialing indicator. HLR system 112 receives the repeat dialing indicator (and possibly MSID for calling party 102). HLR system 112 may store the repeat dialing indicator (and possibly the MSID for calling party 102) in a subscriber record for called party 104. At this point, repeat dialing is activated.

When repeat dialing is activated, HLR system 112 monitors called party 104 to determine when called party 104 powers on. Assume that called party 104 does power on and register with serving MSC system 114. Serving MSC system 114 transmits a registration message to HLR system 112 for called party 104. HLR system 112 identifies when the called party powers on. HLR system 112 also identifies that calling party 102 has activated the repeat dialing feature to call called party 104. HLR system 112 then transmits an instruction to serving MSC system 114 to attempt to set up a call between called party 104 and calling party 102 responsive to identifying that called party 104 has powered on. The instruction may include the repeat dialing indicator and possibly the MSID for calling party 102. Responsive to the instruction, serving MSC system 114 attempts to set up the call between called party 104 and calling party 102.

Wireless network 100 advantageously provides an effective way of implementing repeat dialing to mobile devices. Because HLR system 112 for called party 104 is in a position to monitor when called party 104 has powered on, HLR system 112 can effectively instruct serving MSC system 114 to re-dial called party 104 as soon as called party 104 powers on. Calling party 102 advantageously does not need to repeatedly dial called party 104 to try to reach called party 104, as wireless network 100 performs the repeat dialing.

Figure 3:
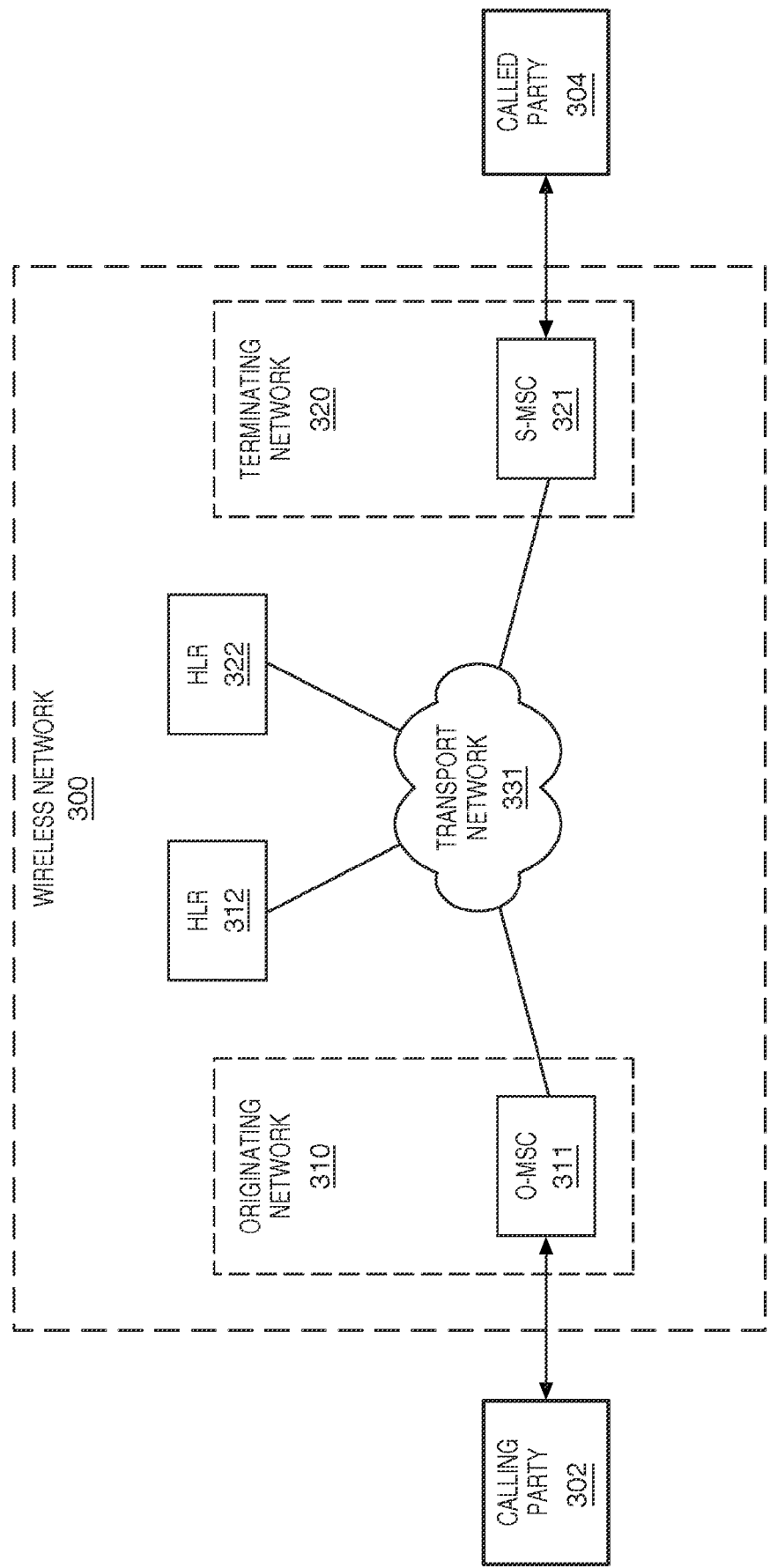
FIG. 3 illustrates another wireless network in an exemplary embodiment of the invention.

FIG. 3 illustrates another wireless network 300 in an exemplary embodiment of the invention. In FIG. 3, calling party 302 is placing a call to called party 304. Calling party 302 comprises a mobile calling party and called party 304 comprises a mobile called party. Wireless network 300 includes an originating MSC (O-MSC) 311, an HLR 312 for calling party 302, an HLR 322 for called party 304, and a serving MSC (S-MSC) 321. O-MSC 311 is part of an originating network 310 for the call. S-MSC 321 is part of a terminating network 320 for the call. O-MSC 311, HLR 312, HLR 322, and S-MSC 321 are connected to a transport network 331. Transport network 331 may comprise a circuit-based network, a packet-based network, or a combination of the two. Wireless network 300 may include other components, devices, or systems not shown in FIG. 3.

Activating Repeat Dialing

Figure 4:
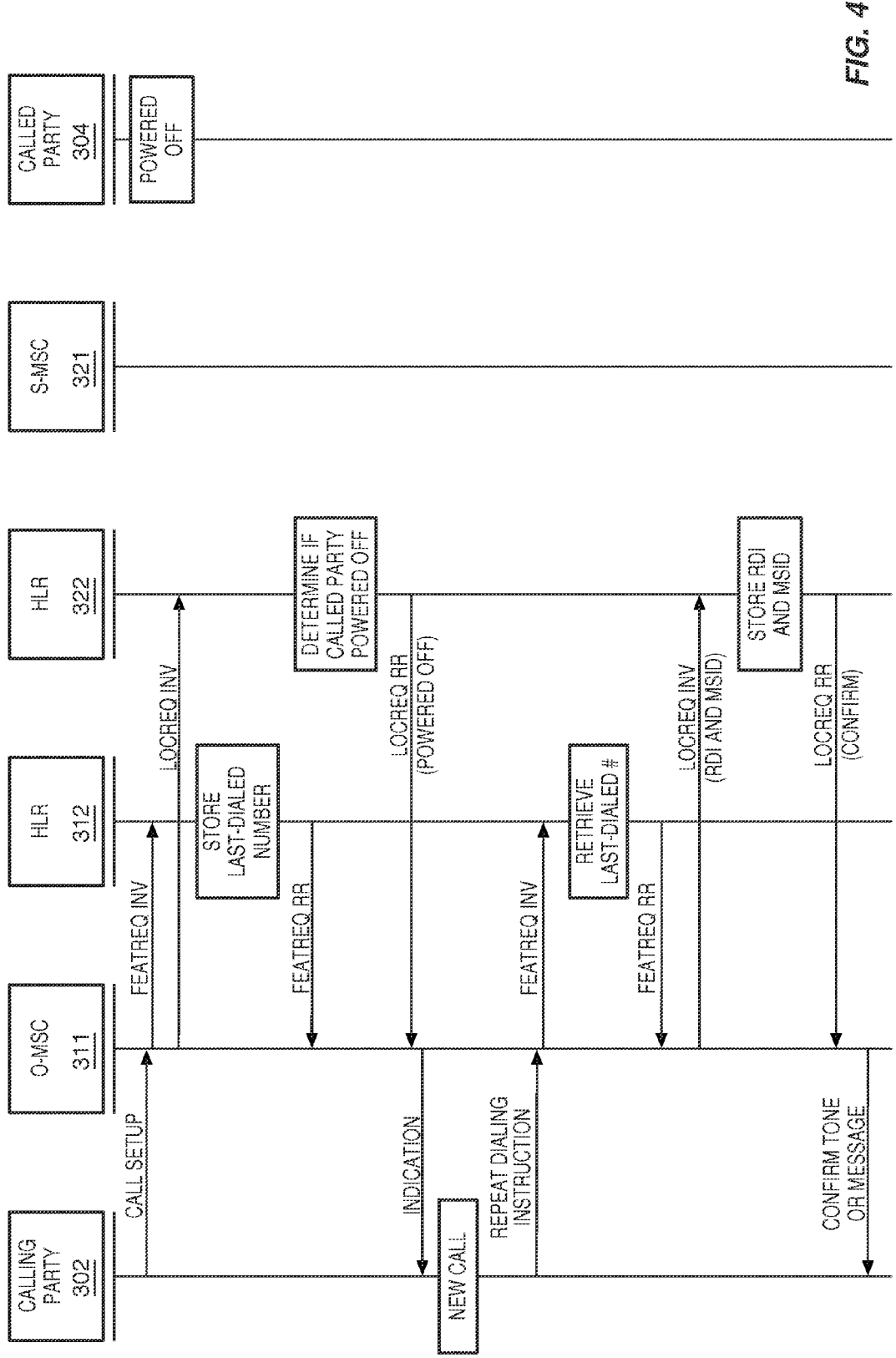
FIGS. 4-6 are message diagrams illustrating processes of activating the repeat dialing feature in the wireless network of FIG. 3 in exemplary embodiments of the invention.
Figure 5:
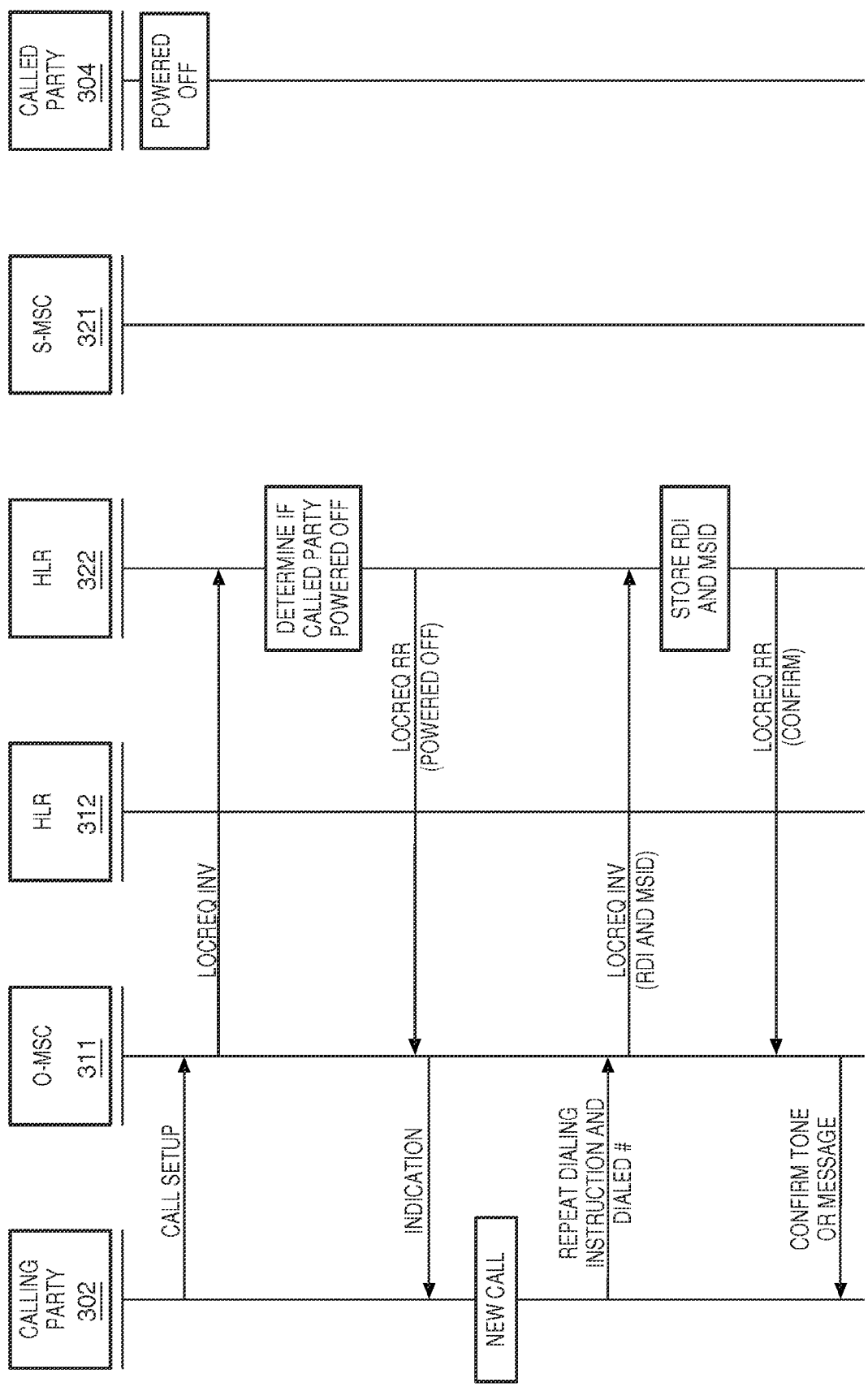
Figure 6:
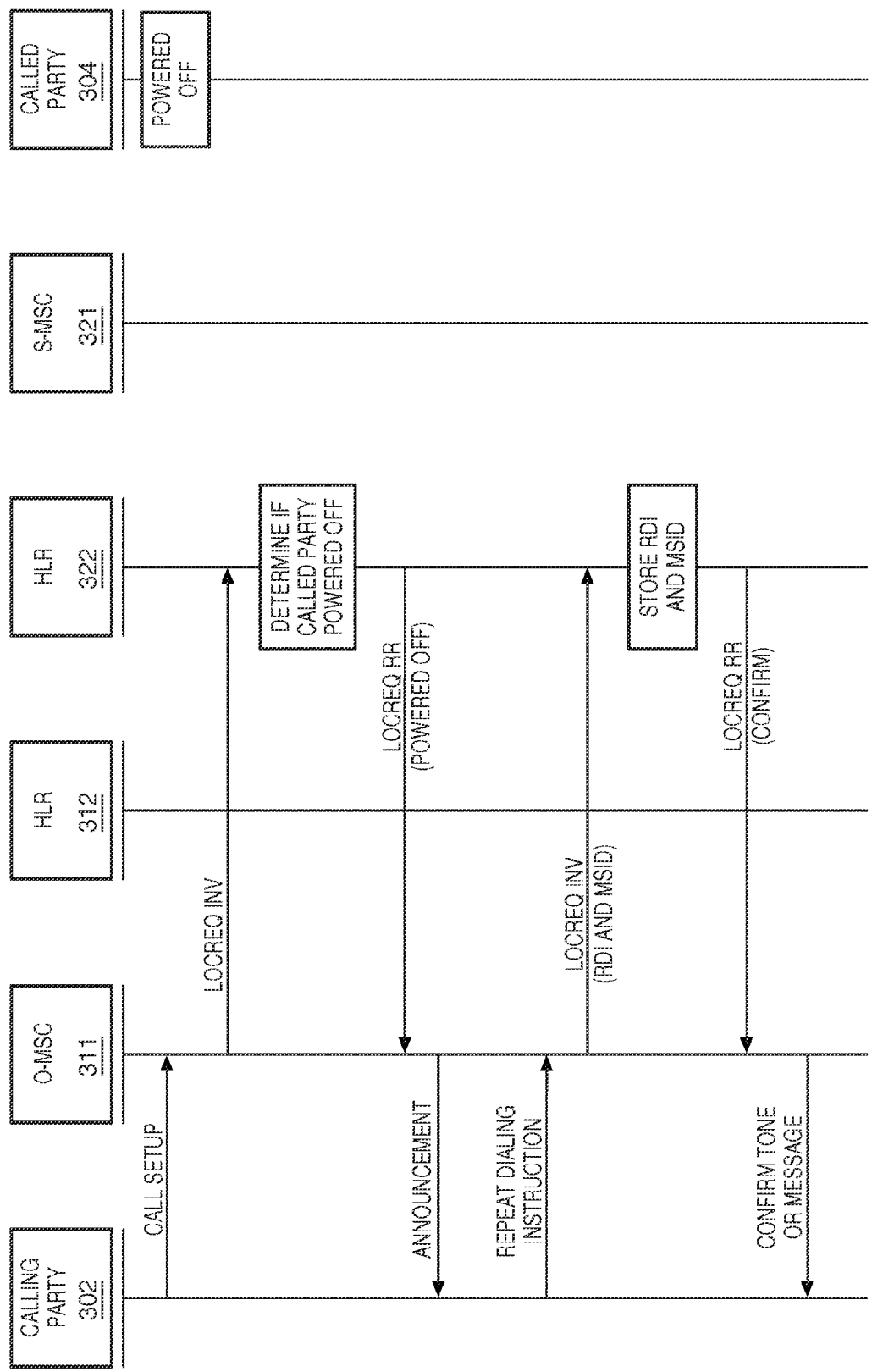

Wireless network 300 provides for repeat dialing of mobile communication devices, such as the device for called party 304. FIGS. 4-6 illustrate three processes to activate the repeat dialing feature in wireless network 300. The invention is not limited to the embodiments in FIGS. 4-6, as the repeat dialing feature may be activated according to other desired processes.

FIG. 4 is a message diagram illustrating a manner of activating the repeat dialing feature in an exemplary embodiment of the invention. In this embodiment, calling party 302 is a subscriber to the repeat dialing feature. The service provider using wireless network 300 offers a repeat dialing feature (most likely for a monthly charge) to which calling party 302 has previously subscribed.

In FIG. 4, calling party 302 initiates a call to called party 304 with a call setup message. O-MSC 311 receives the call setup message. The call setup message includes the dialed number of called party 304. With calling party 302 being a subscriber to the repeat dialing feature, O-MSC 311 automatically transmits a FeatureRequest invoke message (FEATREQ INV) to HLR 312 for calling party 302 that includes the number for called party 304. O-MSC 311 does this for each number dialed by calling party 302. HLR 312 stores the last-dialed number for calling party 302 (which is the number for called party 304), and transmits a FeatureRequest return result message (FEATREQ RR) to O-MSC 311.

O-MSC 311 transmits a LocationRequest invoke message (LOCREQ INV) to HLR 322 for called party 304. The LocationRequest invoke message is to determine where to route the call. The LocationRequest invoke message may be transmitted in parallel with the FeatureRequest invoke message so that call setup time is not affected by storing the last-dialed number of calling party 102. Responsive to the LocationRequest invoke message, HLR 322 determines called party 304 is powered off. HLR 322 determines that called party 304 is powered off based on a Mobile Status field in the subscriber record for called party 304. The Mobile Status field will be set to "powered-off", "unknown", or something similar. HLR 322 then transmits a LocationRequest return result message (LOCREQ RR) to O-MSC 311 indicating that called party 304 is powered off. The LocationRequest return result message may comprise a Temporary Dialed Number (TDN) for a voice mail server for called party 302, an instruction to provide an announcement to calling party 302 that called party 304 is powered off, or some other data. O-MSC 311 may then indicate to calling party 302 that called party 304 is powered off. For instance, O-MSC 311 may transmit an announcement to calling party 302 indicating that called party 304 is powered off. O-MSC 311 may also route the call to a voice mail server for called party 304, which indicates to calling party 302 that called party 304 is unavailable. Once O-MSC 311 indicates to calling party 302 that called party 304 is powered off, calling party 302 may activate the repeat dialing feature.

If calling party 302 wants to activate the repeat dialing feature to automatically call called party 304 back, then calling party 302 initiates a new call. Calling party 302 enters a repeat dialing instruction to activate the repeat dialing feature. For instance, a repeat dialing instruction may comprise dialing *66 or entering another code. Responsive to receiving the repeat dialing instruction, O-MSC 311 transmits a FeatureRequest invoke message to HLR 312 for calling party 302 to retrieve the last-dialed number of calling party 302. HLR 312 retrieves the last-dialed number of calling party 102 and transmits a FeatureRequest return result message to O-MSC 311 that includes the last-dialed number of calling party 302, which is the number for called party 304 in this embodiment.

O-MSC 311 then transmits a LocationRequest invoke message to HLR 322 for called party 304 based on the last-dialed number of calling party 302. The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 stores the repeat dialing indicator and the MSID for calling party 302 in a subscriber record for called party 304. At this point, repeat dialing is activated.

HLR 322 then transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated.

FIG. 5 is a message diagram illustrating another process of activating the repeat dialing feature in an exemplary embodiment of the invention. In this embodiment, calling party 302 is not a subscriber to the repeat dialing feature. Although not a subscriber, calling party 302 is activating the repeat dialing feature on a per-call basis.

In FIG. 5, calling party 302 initiates a call to called party 304 with a call setup message. O-MSC 311 receives the call setup message. O-MSC 311 transmits a LocationRequest invoke message (LOCREQ INV) to HLR 322 for called party 304. The LocationRequest invoke message is to determine where to route the call. Responsive to the LocationRequest invoke message, HLR 322 determines called party 304 is powered off. HLR 322 then transmits a LocationRequest return result message (LOCREQ RR) to O-MSC 311 indicating that called party 304 is powered off. O-MSC 311 may then indicate to calling party 302 that called party 304 is powered off.

If calling party 302 wants to activate the repeat dialing feature to automatically call called party 304 back, then calling party 302 initiates a new call. Calling party 302 enters a repeat dialing instruction followed by a telephone number to be repeat-dialed (the number for called party 304 in this embodiment). For instance, a repeat dialing instruction may comprise dialing *66 followed by the telephone number for called party 304. Even though calling party 302 is not a full-time subscriber to the repeat dialing feature, calling party 302 may activate the feature on a per-call basis.

O-MSC 311 receives the repeat dialing instruction and the telephone number from calling party 302. O-MSC 311 then transmits a LocationRequest invoke message to HLR 322 for called party 304 based on the telephone number entered by calling party 302. The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 stores the repeat dialing indicator and the MSID for calling party 302 in a subscriber record for called party 304. At this point, repeat dialing is activated.

HLR 322 then transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated. Once again, calling party 302 is not a subscriber to the repeat dialing feature but can activate the repeat dialing feature on a per-call basis.

FIG. 6 is a message diagram illustrating another process of activating the repeat dialing feature in an exemplary embodiment of the invention. In this embodiment, wireless network 300 uses an announcement to ask calling party 302 whether the repeat dialing feature should be activated.

In FIG. 6, calling party 302 initiates a call to called party 304 with a call setup message. O-MSC 311 receives the call setup message. O-MSC 311 transmits a LocationRequest invoke message (LOCREQ INV) to HLR 322 for called party 304. The LocationRequest invoke message is to determine where to route the call. Responsive to the LocationRequest invoke message, HLR 322 determines called party 304 is powered off. HLR 322 then transmits a LocationRequest return result message (LOCREQ RR) to O-MSC 311 indicating that called party 304 is powered off. Responsive to the LocationRequest return result message, O-MSC 311 transmits an announcement to calling party 302. The announcement informs calling party 302 that called party 304 is not powered on or is not registered, and asks calling party 302 if the repeat dialing feature should be activated. For instance, the announcement may be: "The party does not have their phone on, please enter a "1" if you would like to activate the repeat dialing feature for a cost of $0.75."

If calling party 302 wants to activate the repeat dialing feature, calling party 302 enters a repeat dialing instruction, such as entering "1" on a keypad. O-MSC 311 receives the repeat dialing instruction from calling party 302. O-MSC 311 has already stored the last-dialed number of calling party 302 in its call register. O-MSC 311 then transmits a LocationRequest invoke message to HLR 322 for called party 304 based on the last-dialed number of calling party 302. The LocationRequest invoke message includes a repeat dialing indicator (RDI) that indicates to HLR 322 that calling party 302 has activated the repeat dialing feature. The LocationRequest invoke message also includes the MSID for calling party 302. HLR 322 stores the repeat dialing indicator and the MSID for calling party 302 in a subscriber record for called party 304. At this point, repeat dialing is activated.

HLR 322 then transmits a LocationRequest return result message (LOCREQ RR) to O-MSC 311 confirming that the repeat dialing feature has been activated. O-MSC 311 transmits a message or tone to calling party 302 indicating that the repeat dialing feature has been activated.

Performing Repeat Dialing

Figure 7:
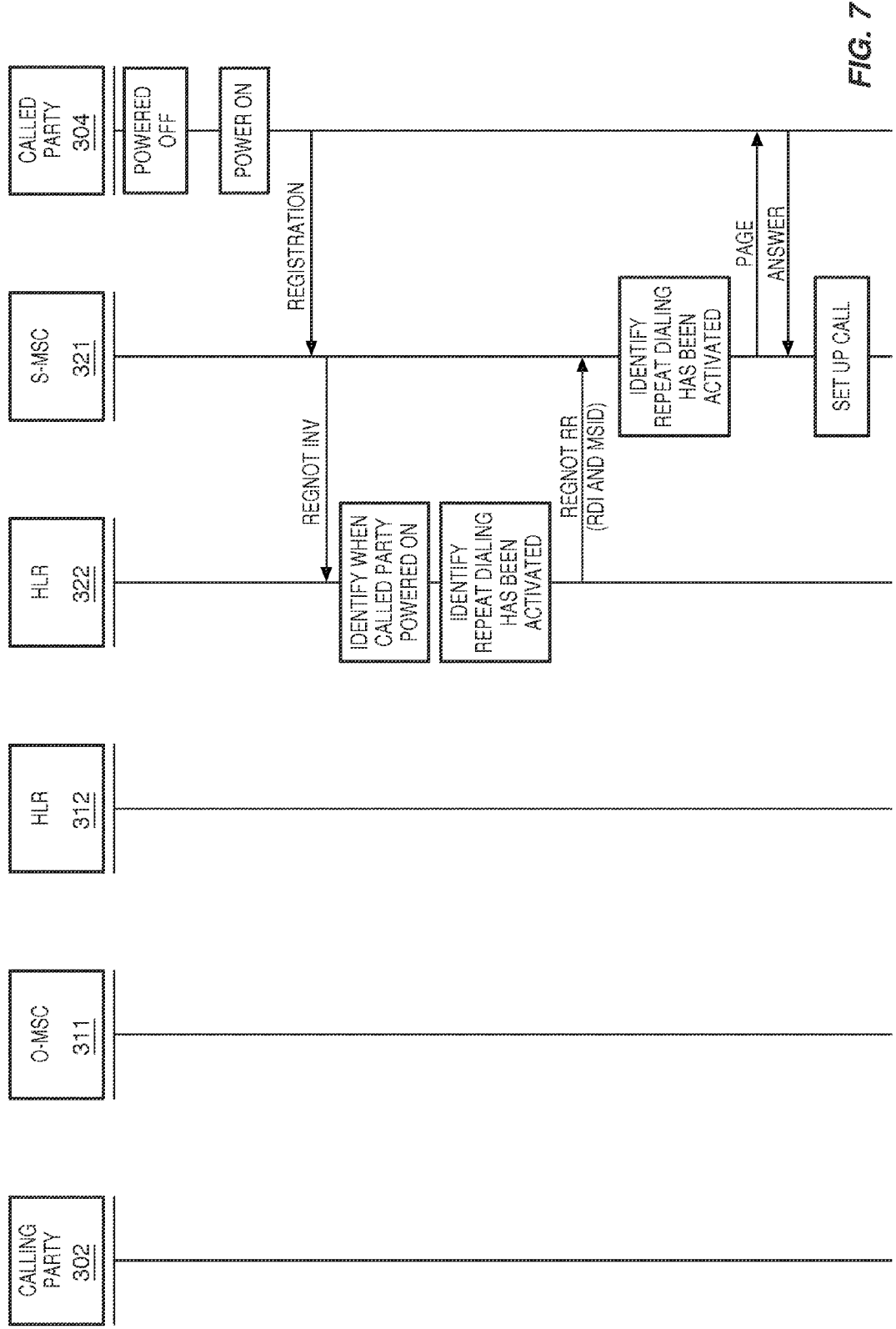
FIG. 7 is a message diagram illustrating how repeat dialing is performed in an exemplary embodiment of the invention.

FIG. 7 is a message diagram illustrating how repeat dialing is performed in an exemplary embodiment of the invention. Assume for this embodiment, that calling party 302 placed a call to called party 304, and called party 304 is powered off. Also assume that repeat dialing has already been activated according to one of the methods described in FIGS. 4-6 or by another method. When called party 304 powers on, called party 304 registers with S-MSC 321. S-MSC 321 transmits a RegistrationNotification invoke (REGNOT INV) message to HLR 322 indicating that called party 304 has powered on. Responsive to the RegistrationNotification invoke message, HLR 322 enters an ID for S-MSC 321 in the Primary Last-Seen field of the subscriber record of called party 304. HLR 322 also accesses the subscriber record for called party 304 to determine if the repeat dialing feature has been activated. The subscriber record of called party 304 includes a repeat dialing indicator and an MSID for calling party 302 in this instance, so HLR 322 determines that calling party 302 has activated the repeat dialing feature for called party 304.

Therefore, HLR 322 transmits RegistrationNotification return result (REGNOT RR) message to S-MSC 321. The RegistrationNotification return result message includes the repeat dialing indicator and the MSID of calling party 302. Responsive to the RegistrationNotification return result message, S-MSC 321 transmits a page to called party 304. If S-MSC 321 receives an answer to the page from called party 304, S-MSC 321 attempts to set up a call between calling party 302 and called party 304. If S-MSC 321 is successful, a call is established between calling party 302 and called party 304. Repeat dialing has then been successfully executed.

We claim:

1. A system comprising:
a Home Location Register (HLR) system for a called party that receives a repeat dialing indicator for a first call placed by a calling party to the called party that is powered off;
the HLR system monitors the called party to identify when the called party powers on responsive to receiving a registration invoke message from the called party, and transmits a registration return result message to a serving Mobile Switching Center (MSC) for the called party responsive to identifying that the called party has powered on, wherein the registration return result message includes an instruction to attempt to set up a second call between the called party and the calling party to implement repeat dialing.

2. The system of claim 1 wherein:
the HLR system for the called party stores the repeat dialing indicator and a Mobile Station Identifier (MSID) of the calling party in a subscriber record for the called party, and transmits the instruction that includes the repeat dialing indicator and the MSID in the registration return result message to the serving MSC responsive to determining that the called party has powered on.

3. The system of claim 1 wherein:
the HLR system for the called party receives the repeat dialing indicator from an originating MSC for the calling party in response to the calling party activating repeat dialing to the called party.

4. The system of claim 3 wherein the repeat dialing indicator comprises a LocationRequest invoke message.

5. The system of claim 1 wherein the calling party comprises a mobile calling party or a wire line calling party.

6. A method comprising:
receiving a repeat dialing indicator in a Home Location Register (HLR) system for a called party regarding a first call placed by a calling party to the called party that is powered off;
monitoring, in the HLR system, the called party to identify when the called party powers on responsive to receiving a registration invoke message from the called party; and
transmitting a registration return result message from the HLR system to a serving Mobile Switching Center (MSC) for the called party responsive to identifying that the called party has powered on, wherein the registration return result message includes an instruction to attempt to set up a second call between the called party and the calling party to implement repeat dialing.

7. The method of claim 6 further comprising:
storing the repeat dialing indicator and a Mobile Station Identifier (MSID) for the calling party in a subscriber record for the called party in the HLR system for the called party; and
transmitting the instruction that includes the repeat dialing indicator and the MSID in the registration return result message from the HLR system to the serving MSC responsive to determining that the called party has powered on.

8. The method of claim 6 wherein receiving a repeat dialing indicator comprises:
receiving the repeat dialing indicator from an originating MSC for the calling party in response to the calling party activating repeat dialing to the called party.

9. The method of claim 8 wherein the repeat dialing indicator comprises a LocationRequest invoke message.

10. The method of claim 6 wherein the calling party comprises a mobile calling party or a wire line calling party.

11. A system comprising:
a Home Location Register (HLR) system for a called party of a first call placed by a calling party, wherein the called party is powered off when the first call is placed;
the HLR system receives an indication that the calling party activates repeat dialing to the called party;
in response to the activation of repeat dialing, the HLR system monitors the called party to identify when the called party powers on responsive to the called party registering with the HLR system, and transmits a registration return result message to a serving Mobile Switching Center (MSC) for the called party responsive to identifying that the called party has powered on, wherein the registration return result message includes an instruction to attempt to set up a second call between the called party and the calling party to implement repeat dialing.

* * * * *